(12) United States Patent
Wang et al.

(10) Patent No.: US 12,519,332 B2
(45) Date of Patent: Jan. 6, 2026

(54) ENERGY STORAGE CHARGING SYSTEM

(71) Applicant: SHENZHEN INFYPOWER CO., LTD, Guangdong (CN)

(72) Inventors: Weiwei Wang, Guangdong (CN); Chunhui Zhu, Guangdong (CN); Xing Yue, Guangdong (CN)

(73) Assignee: SHENZHEN INFYPOWER CO., LTD, Shenzhen (CN)

( * ) Notice: Subject to any disclaimer, the term of this patent is extended or adjusted under 35 U.S.C. 154(b) by 887 days.

(21) Appl. No.: 17/697,956

(22) Filed: Mar. 18, 2022

(65) Prior Publication Data

US 2022/0209545 A1 Jun. 30, 2022

Related U.S. Application Data

(63) Continuation of application No. PCT/CN2020/082294, filed on Mar. 31, 2020.

(30) Foreign Application Priority Data

Apr. 24, 2019 (CN) .......................... 201910338016.6

(51) Int. Cl.
*H02J 7/00* (2006.01)
*H02J 7/02* (2016.01)
*H02J 7/35* (2006.01)

(52) U.S. Cl.
CPC ................ *H02J 7/007* (2013.01); *H02J 7/02* (2013.01); *H02J 7/35* (2013.01)

(58) Field of Classification Search
CPC .... H02J 1/102; H02J 2207/20; H02J 2310/48; H02J 7/02; H02J 7/35
See application file for complete search history.

(56) References Cited

U.S. PATENT DOCUMENTS 10,250,158 B2 * 4/2019 Sterna ................ H02M 1/4258
2018/0290544 A1 * 10/2018 Long ..................... H02J 7/0018
(Continued)

FOREIGN PATENT DOCUMENTS

| CN | 105186669 A | 12/2015 |
| CN | 109672260 A | 4/2019 |

OTHER PUBLICATIONS

International Search Report of PCT Patent Application No. PCT/CN2020/082294 issued on Jun. 22, 2020.

*Primary Examiner* — Julian D Huffman
*Assistant Examiner* — Sadia Kousar

(57) ABSTRACT

An energy storage charging system includes an AC/DC conversion apparatus for high-frequency isolation transform which takes electricity from a power grid and supplies electricity to a load, and a DC/DC conversion apparatus for high-frequency isolation transform which supplies electricity to a load from battery discharge. In the present invention, charging is performed by converting into direct-current electric energy through the charging AC/DC, electricity may be simultaneously discharged to a load electricity—supply bus by means of a high-frequency isolation DC/DC conversion apparatus, and at the same time, an AC/DC connected with alternating current converts alternating-current electric energy into direct-current electric energy to output to the load electricity-supply bus so as to supply electricity to the load. The charging AC/DC is isolated by means of a high-frequency isolation transformer and electric energy passing through the transformer is adjusted.

12 Claims, 3 Drawing Sheets

(56) References Cited

U.S. PATENT DOCUMENTS

2020/0244096 A1\* 7/2020 Tabuchi ............... H02M 3/158
2021/0135581 A1\* 5/2021 Rajashekara ....... H02M 1/4241
2021/0237611 A1\* 8/2021 Boehm ................ H02J 7/0013

\* cited by examiner

ENERGY STORAGE CHARGING SYSTEM

CROSS REFERENCE TO RELATED APPLICATIONS

The present application is a Continuation Application of PCT Application No. PCT/CN2020/082294 filed on Mar. 31, 2020, which claims the benefit of Chinese Patent Application No. 201910338016.6 filed on Apr. 24, 2019. All the above are hereby incorporated by reference. in their entirety.

FIELD

The present disclosure relates to a charging system, in particular to an energy storage charging system.

BACKGROUND

Generally, a charging system of an electric vehicle or other types of loads takes electricity from an alternating-current electric grid. However, as there is a limit to power supplying of the alternating-current electric grid, especially, a capacity of a single box-type transformer is limited, it is impossible to make a charging system exceeding the capacity of the single box-type transformer access into it. Meanwhile, electricity charges of the alternating-current electric grid in different periods are different, charging of the electric vehicle or other types of loads uses electricity randomly, so there is a case of an electricity charge of a using peak or a failure in full-power charging.

Meanwhile, there is a problem of short-circuit protection when an energy storage apparatus is connected with a direct-current bus in an existing energy storage system at present. In other words, when the direct-current bus has a short circuit, or one side of a conversion apparatus connected with the direct-current bus has a short circuit, electric energy of the energy storage apparatus is also released to a short dot, which may cause a risk of accident expanding. A traditional solution is that an isolation transformer is added to an alternating-current side of an inverter system, as a frequency is low, electric energy passing through the transformer is still quite large, and there is no effective method to limit the electric energy released by the energy storage apparatus for the direct-current bus.

There is a limit to directly using an energy storage mode in a charge-discharge application with an impact feature. For example, as for large-current charging of energy recovery, cost or a size of a battery directly used is large, the solution is to combine different energy storage modes, high-ratio short-time energy storage adopts a super-capacitor or a large-ratio energy storage battery, long-time energy storage adopts combination of common lithium ion batteries, and energy conversion cannot be flexibly performed.

SUMMARY

Technical Problem

A technical problem to be solved by the present disclosure is to provide an energy storage charging system. An energy storage apparatus and a direct-current bus are isolated through a high-frequency transformer, the energy storage apparatus is limited if a short circuit occurs, the risk of accident expanding is effectively prevented, and many defects in the prior art are effectively overcome.

Technical Solution

The present invention is realized by means of the following technical solution: an energy storage charging system, comprising A: an AC/DC conversion apparatus for high-frequency isolation transform and an energy storage charging direct-current bus; wherein a first connecting point of the AC/DC conversion apparatus is connected to an energy storage apparatus, a second connecting point of the AC/DC conversion apparatus is connected to an alternating-current electric grid, and the AC/DC conversion apparatus makes electric energy of the electric grid be subjected to high-frequency isolation transform and then charges the energy storage apparatus;

B: a DC/DC conversion apparatus for high-frequency isolation transform and a load direct-current bus, wherein a first connecting point of the DC/DC conversion apparatus is connected to the energy storage charging direct-current bus, a second connecting point of the DC/DC conversion apparatus is connected to the load direct-current bus, and the DC/DC conversion apparatus makes electric energy of the energy storage apparatus connected to the energy storage charging direct-current bus be subjected to high-frequency isolation transform and then supply electricity to a load on the load direct-current bus;

C: an AC/DC conversion apparatus for high-frequency isolation transform and a load electricity-supply direct-current bus, wherein a first connecting point of the AC/DC conversion apparatus is connected to the alternating-current electric grid, a second connecting point of the AC/DC conversion apparatus is connected to the load direct-current bus, and the AC/DC conversion apparatus makes the electric energy of the electric grid be subjected to high-frequency isolation transform and then supply electricity to the load; and D: an apparatus for charging an electric vehicle or other types of loads, wherein a first connecting point of the apparatus is the load direct-current bus, a second connecting point of the apparatus is a charging port of the electric vehicle or other types of loads, and a voltage of the bus and charging current of the electric vehicle or other types of loads are dynamically adjusted according to a voltage and current needed by the electric vehicle or other types of loads.

As a preferred technical solution, the DC/DC conversion apparatus for high-frequency isolation transform includes a first-stage converter, a high-frequency isolation transformer and a second-stage converter, the first-stage converter is connected with an energy storage charging direct-current bus, the second-stage converter is connected with the load direct-current bus, and the high-frequency isolation transformer is connected with the first-stage converter and the second-stage converter.

As a preferred technical solution, direct-current electric energy of the energy storage unit is converted into high-frequency electric energy through the first-stage converter of the DC/DC conversion apparatus via an energy storage direct-current bus, converted into high-frequency electric energy with different voltages through conversion of the high-frequency isolation transformer, and then converted into a direct current via the second-stage converter to be output to the load direct-current bus.

As a preferred technical solution, electric energy on two sides of the high-frequency isolation transformer of the DC/DC conversion apparatus is isolated through the high-frequency isolation transformer, electric conductors on the two sides are not in direct conduction, and the high-frequency electric energy is transmitted from one side to the other side through electromagnetic induction.

As a preferred technical solution, the DC/DC conversion apparatus comprises a DC/DC conversion control unit, the DC/DC conversion control unit internally controls a first-stage converter, a second-stage converter and a high-frequency isolation transformer to work, externally has a communication bus connected with a system main control unit and communicates with the DC/DC conversion apparatus through the system main control unit so as to control discharge voltage, current and power of the energy storage apparatus.

As a preferred technical solution, the energy storage charging direct-current bus comprises a positive bus and a negative bus, the positive bus and the negative bus are connected to one or more said high-frequency isolation DC/DC conversion apparatuses respectively and meanwhile are connected to a load charging bus and an apparatus thereof through an input/output access point for discharging.

As a preferred technical solution, the electric energy of the alternating-current electric grid is converted through the AC/DC conversion apparatus and then is stored in the energy storage apparatus through the energy storage direct-current bus. In the process of electric energy inputting, a voltage and a current of the electric energy change according to demands of the energy storage apparatus; or the energy storage direct-current bus is connected with various energy storage apparatuses, and different types of energy storage apparatuses or a plurality of same energy storage apparatuses are connected to the same energy storage direct-current bus for electric energy storage and exchange.

As a preferred technical solution, the AC/DC conversion apparatus for high-frequency isolation transform includes a first-stage converter, a high-frequency isolation transformer and a second-stage converter, the first-stage converter is connected with the alternating-current electric grid, the second-stage converter is connected with the energy storage direct-current bus, and the high-frequency isolation transformer is connected with the first-stage converter and the second-stage converter.

As a preferred technical solution, electric energy on two sides of a high-frequency isolation transformer is isolated through the high-frequency isolation transformer, electric conductors on the two sides are not in direct conduction, and high-frequency electric energy is transmitted from one side to the other side through electromagnetic induction.

As a preferred technical solution, the AC/DC conversion apparatus comprises an AC/DC conversion control unit. The AC/DC conversion control unit internally controls the first-stage converter, the second-stage converter and the high-frequency isolation transformer to work, externally has a communication bus connected with the system main control unit and communicates with the AC/DC conversion apparatus through the system main control unit to control electric energy conversion of the energy storage direct-current bus from the electric grid so as to realize electric energy storage of the energy storage apparatus.

As a preferred technical solution, a load electricity-supply direct-current bus comprises a positive bus and a negative bus. The positive bus and the negative bus are connected to one or more said high-frequency isolation AC/DC conversion apparatuses respectively, the other side of the apparatus is connected to the alternating-current electric grid, the electric energy of the electric grid is converted into direct-current electric energy to supplement the load electricity-supply bus.

As a preferred technical solution, conversion power of the AC/DC apparatus connected to the load electricity-supply bus is controlled by a system main control unit, and the system main control unit controls conversion voltage, current and power in a preset optimal control mode according to current charging demands of the electric vehicle or other types of loads, current conditions of power and electricity charge of the electric grid, current conditions of power demands of other charging devices in the electric grid and features of the energy storage apparatus.

As a preferred technical solution, the quantity of charging ports is one or more, power allocation and switching are performed among different load electricity-supply buses connected with the corresponding charging ports, the system main control unit realizes control over a voltage, current and power of the load electricity-supply buses through control over energy storage charging AC/DC, energy storage discharge DC/DC and load electricity-supply AC/DC according to the electricity-supply demands of the electric vehicle or other types of loads.

As a preferred technical solution, the system main control unit is a single integrated main control unit, or a collecting and distributing type of main control unit formed by combining a plurality of control units in a layered architecture.

Beneficial Effects

The beneficial effects of the present invention are: in the present disclosure, the energy storage apparatus, the load electricity-supply direct-current bus and the alternating-current electric grid are all isolated through the high-frequency isolation transformers of the high-frequency isolation DC/DC and AC/DC conversion apparatuses, the electric energy passing through the transformers is limited, thus a fault current of the direct-current bus is reduced, and a purpose of safety protection is achieved. Meanwhile, electric energy supplement of the load electricity-supply direct-current bus and the alternating-current electric grid is performed through the high-frequency isolation AC/DC conversion apparatus, the load direct-current bus is directly connected with the charging port of the electric vehicle or other types of loads, and the system main control unit performs optimal charging control according to the current charging demands of the electric vehicle or other types of loads, electric energy storage states of the energy storage apparatus and states of the alternating-current electric grid.

BRIEF DESCRIPTION OF THE DRAWINGS

In order to illustrate the embodiments of the present invention more clearly, drawings needing to be used in the embodiments or in the prior art will be introduced below briefly. Obviously, the drawings in the description below are merely some embodiments of the present invention, those ordinary skilled in the art can further obtain other drawings according to these drawings without creative work.

DETAILED DESCRIPTION OF THE EMBODIMENTS

Figure 1:
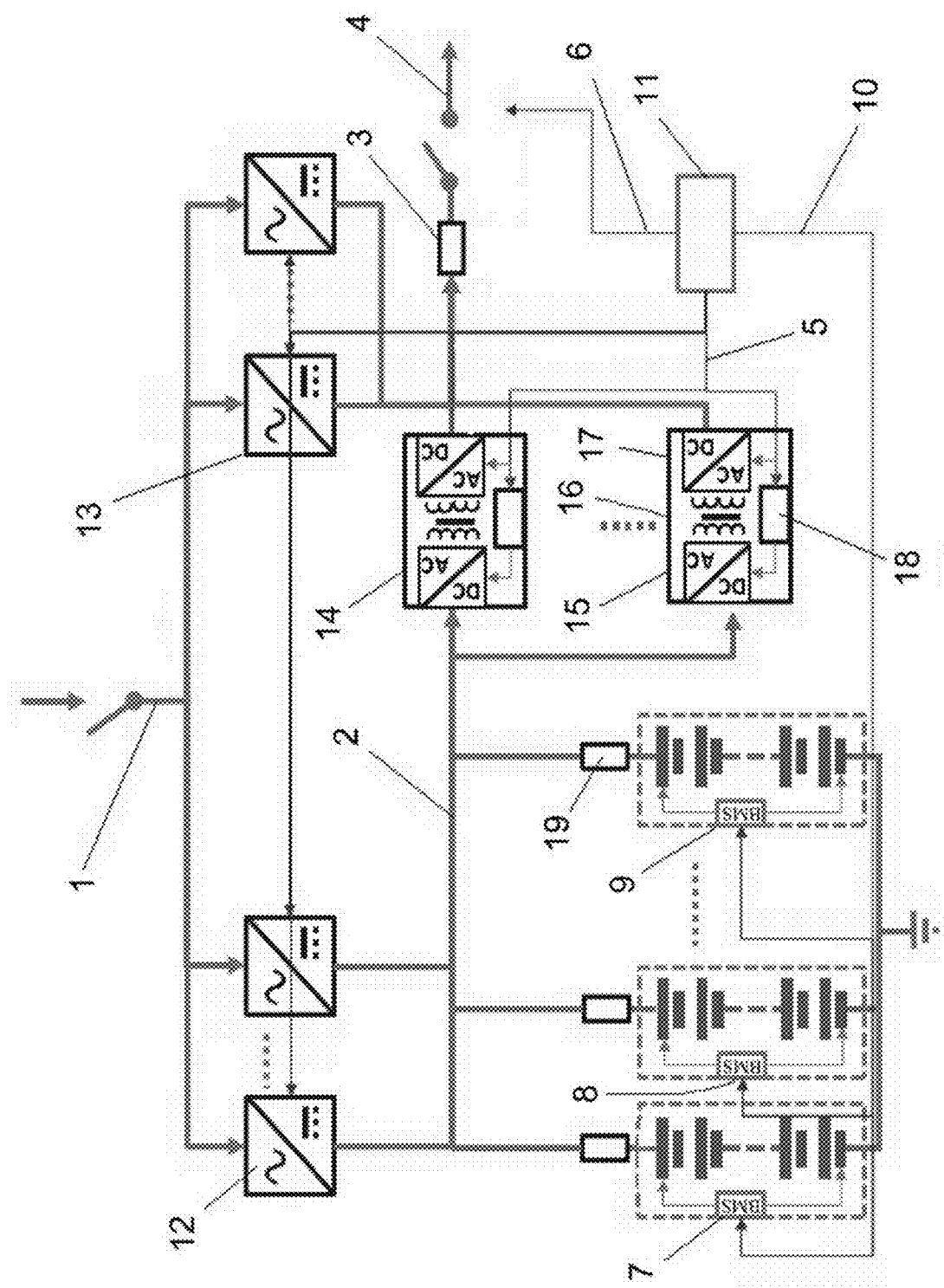
FIG. 1 is a schematic structural diagram in a whole of the present invention.

All features disclosed in this specification, or all steps in a method or process disclosed may be combined in any manner, except for mutually exclusive features and/or steps.

Any disclosed features in this specification (including any appended claims, abstract or drawings), unless otherwise stated, should all be replaced by other equivalent features or features having the similar aims. That is, unless otherwise stated, each feature is only one example of a series of equivalent or similar features.

In description of the present invention, it needs to be stated that a direction or position relationship indicated by terms such as "one end", "the other end", "outer side", "upper", "inner side", "horizontal", "coaxial", "center", "end", "length" and "outer end" is based on a direction or position relationship shown in the drawings, and only aims to conveniently describe the present invention and simplify the description instead of indicating or implying that the referred device or element must have a specific direction and be constructed and operated by a specific direction, which should not be understood as limits to the present invention.

In addition, in the description of the present invention, "more" or "a plurality of" means at least two, for example, two, three, etc., unless otherwise expressively and specifically limited.

The terms used in the present invention, such as "upper", "above", "lower", "below", which represent a spatial relative position describe a relationship of one unit or feature relative to another unit or feature in the drawings for the sake of convenient illustration. The terms for the spatial relative position may aim to include different directions other than those shown in the drawings during using or working of a device. For example, if the device overturns, it is described that a unit located "below" or "under" other units or features should be located "above" the other units or features. Accordingly, the exemplary term "below" may include the two directions of upper and lower. The device may be directed in other manners (rotated by 90 degrees or facing other directions), and space-dependent descriptions used in the disclosure are correspondingly explained.

In the present invention, unless otherwise specified and limited, the terms "arrange", "sleeved connection", "connection", "penetrate", "inserting connection", etc. should be generally understood. For example, it may be fixed connection, or also detachable connection, or integrated; it may be mechanical connection, or electrical connection; it may be direction connection, or also be indirectly connected through an intermedia, it may be communication of interiors of two elements, or be interactive relationship of two elements, unless otherwise expressly limited. For those ordinary skilled in the prior art, the specific meaning of the above terms in the present invention should be understood according to specific conditions.

As shown in FIG. 1, a DC/DC conversion apparatus 14 for high-frequency isolation transform and an energy storage direct-current bus 2 are comprised. A first connecting point of the DC/DC apparatus is connected to the energy storage direct-current bus 2, a second connecting point of the DC/DC apparatus is connected to a load direct-current bus 3, and the DC/DC apparatus make electric energy of energy storage apparatuses 7, 8 and 9 be subjected to high-frequency isolation transform and then perform load electricity supply on the load direct-current bus 3.

The DC/DC conversion apparatus 14 for high-frequency isolation transform includes a first-stage converter 15, a high-frequency isolation transformer 16 and a second-stage converter 17. The first-stage converter 15 is connected with the energy storage apparatus and the energy storage direct-current bus 2, the second-stage converter 17 is connected with the load direct-current bus 3, and the high-frequency isolation transformer 16 is connected with the first-stage converter 15 and the second-stage converter 17.

In this example, the high-frequency isolation DC/DC conversion converts the direct-current electric energy of an energy storage unit into high-frequency electric energy via the first-stage converter, converts it to high-frequency electric energy with different voltages through conversion of the high-frequency isolation transformer, and then converts it into a direct current via the second-stage converter to be output to the load direct-current bus.

In this example, electric energy on two sides of the high-frequency isolation transformer 16 is isolated through the high-frequency isolation transformer, electric conductors on the two sides are not in direct conduction, and the high-frequency electric energy is transmitted from one side to the other side through electromagnetic induction.

In this example, the DC/DC conversion apparatus comprises a DC/DC conversion control unit 18, and the DC/DC conversion control unit internally controls the first-stage converter 15, the second-stage converter 17 and the high-frequency isolation transformer 16 to work and externally has a communication bus 5 connected with a system main control unit 11.

In this example, the system main control unit 11 obtains energy storage information of the energy storage apparatuses 7/8/9 through a communication bus 10 and controls the DC/DC conversion apparatus through the communication bus 5, the control unit 18 of the DC/DC conversion apparatus controls conversion power and a voltage and current of the DC/DC conversion apparatus according to communication between the communication bus 5 and the system main control unit and meanwhile through direct-current bus voltage information collected by an internal sampling circuit.

In this example, the energy storage direct-current bus 2 comprises a positive bus and a negative bus, and the positive bus and the negative bus are connected to one or more said high-frequency isolation DC/DC conversion apparatuses respectively and are meanwhile connected to other apparatuses through an input/output access point.

In this example, the energy storage apparatuses 7, 8 and 9 store electric energy which is input from the outside through direct-current input of the energy storage direct-current bus, or release the electric energy through the bus. In an input and output process of the electric energy, a voltage and a current of the electric energy change; or the bus is connected with various energy storage apparatuses, different types of energy storage apparatuses or a plurality of same energy storage apparatuses are connected to the same energy storage direct-current bus for electric energy exchange.

In this example, a transform power magnitude and direction of the energy storage apparatus connected to the energy storage direct-current bus are controlled by the system main control unit, and the system main control unit controls the transform power and direction in a preset optimal control mode according to a current state and feature of the energy storage apparatus, a state of the alternating-current electric grid and states of the loads.

In this example, the alternating-current electric grid 1 converts alternating-current electric energy into direct-current electric energy through the high-frequency isolation AC/DC conversion apparatus 12 to be output to the energy storage direct-current bus 2, so that the energy storage apparatuses 7/8/9 on the bus are charged, the high-frequency isolation AC/DC conversion apparatus communicates with the system main control unit through the communication bus 5 to be controlled by the system main control unit, and the system main control unit controls a charging voltage and current to the energy storage apparatus in a preset optimal control mode according to a current state of the electric grid, the states of the loads and the state of the energy storage apparatus.

In this example, the load direct-current bus 3 is connected with a charging port 4 of the electric vehicle or other types of loads, charging voltage and current demands of the electric vehicle or other types of loads communicate with the system main control unit through a bus 6, and the system main control unit adjusts a direct-current bus voltage and current through charging demand information of the electric vehicle or other types of loads and optimal control over the AC/DC and DC/DC so as to meet optimal electric energy utilization and charging demands of the electric vehicle or other types of loads.

In this example, the system main control unit 11 collects information of the energy storage apparatus, charging information of the electric vehicle or other types of loads through the communication bus, combines the states of the alternating-current electric grid and power states of other charging systems in the electric grid, performs charging of the energy storage apparatus by controlling obtainment of alternating-current power of the AC/DC conversion apparatus 12, controls discharge power magnitude and voltage current magnitude of the energy storage apparatus through the DC/DC conversion apparatus 14, meanwhile performs supplement charging of the loads by controlling obtainment of alternating-current power of the AC/DC conversion apparatus 13 and synchronously adjusts the load direct-current bus voltage and current so as to meet the optimal electric energy utilization and the charging demands of the electric vehicle or other types of loads.

Embodiment 1

Figure 2:
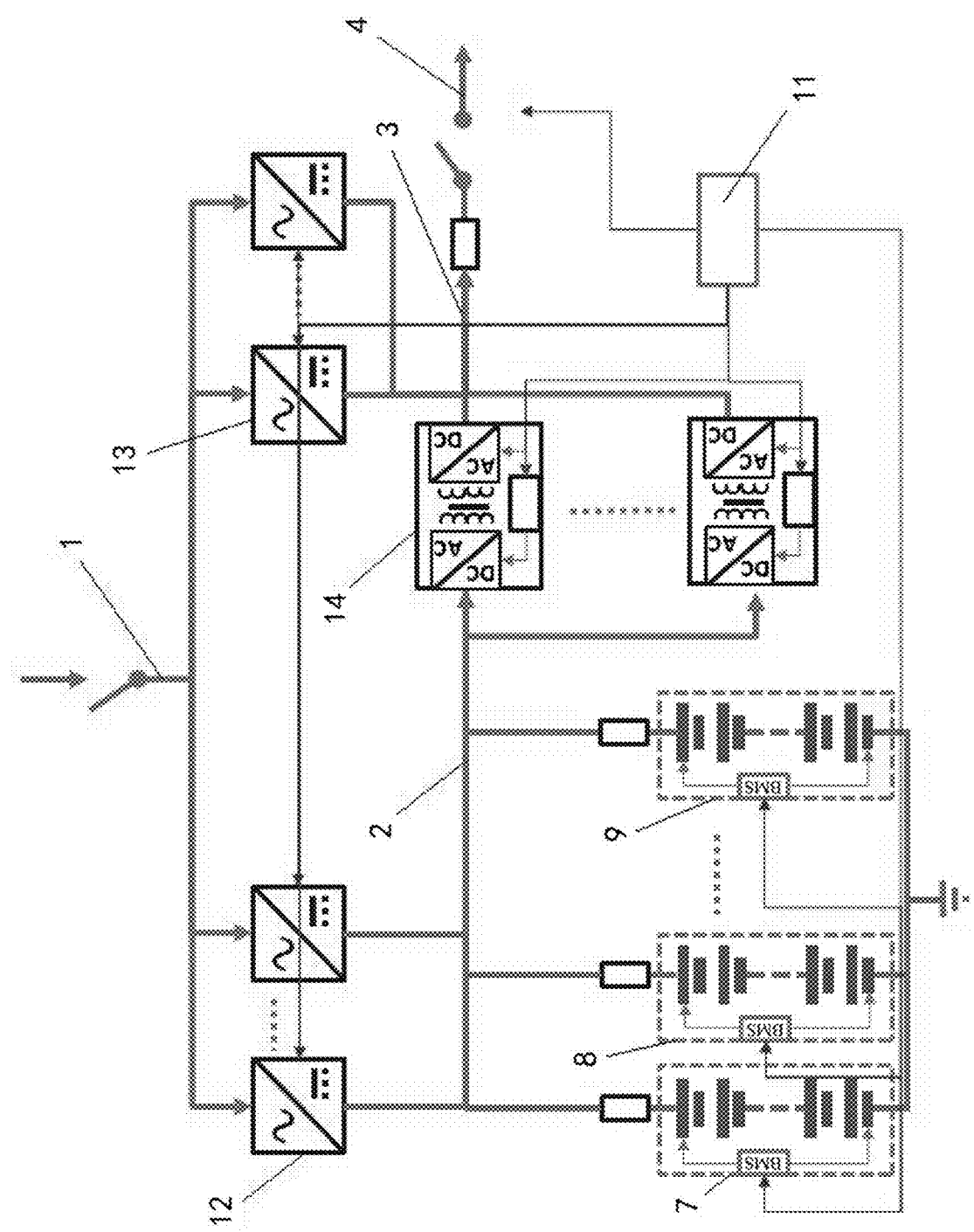
FIG. 2 is a schematic structural diagram of a first embodiment of the present invention.

As shown in FIG. 2, a high-frequency isolation conversion energy storage charging system comprises a DC/DC conversion apparatus 14 for high-frequency isolation transform, an energy storage direct-current bus 2, energy storage battery packs 7/8/9, a double-way charging AC/DC apparatus 12, a double-way load electricity-supply AC/DC apparatus 13, a load direct-current bus 3, a port 4 of an electric vehicle or other loads and a system main control unit 11.

The high-frequency isolation conversion energy storage system comprises a plurality of battery packs and the energy storage direct-current bus connected with batteries. The energy storage charging AC/DC conversion apparatus is connected with an alternating-current electric grid and the energy storage direct-current bus.

Energy of the plurality of battery packs supply electricity to the loads through DC/DC conversion, and meanwhile the electric grid charges the battery packs through the AC/DC conversion apparatus. The battery packs can also perform feed to the electric grid through the double-way AC/DC reversely.

The alternating-current electric grid supplies electricity to the loads and meanwhile reversely feed electric energy of the load direct-current bus back to the alternating-current electric grid through the double-way load electricity-supply AC/DC conversion apparatus.

The embodiment is applied to supplementing energy to the batteries and supplying electricity to the loads by the electric grid. Or the embodiment may be applied to feeding to the electric grid reversely by the energy storage apparatus, or V2G application, performing feed of electric energy of batteries of the electric vehicle to the electric grid, or reversely charging the energy storage batteries through the electric energy of the batteries of the electric vehicle.

Embodiment 2

Figure 3:
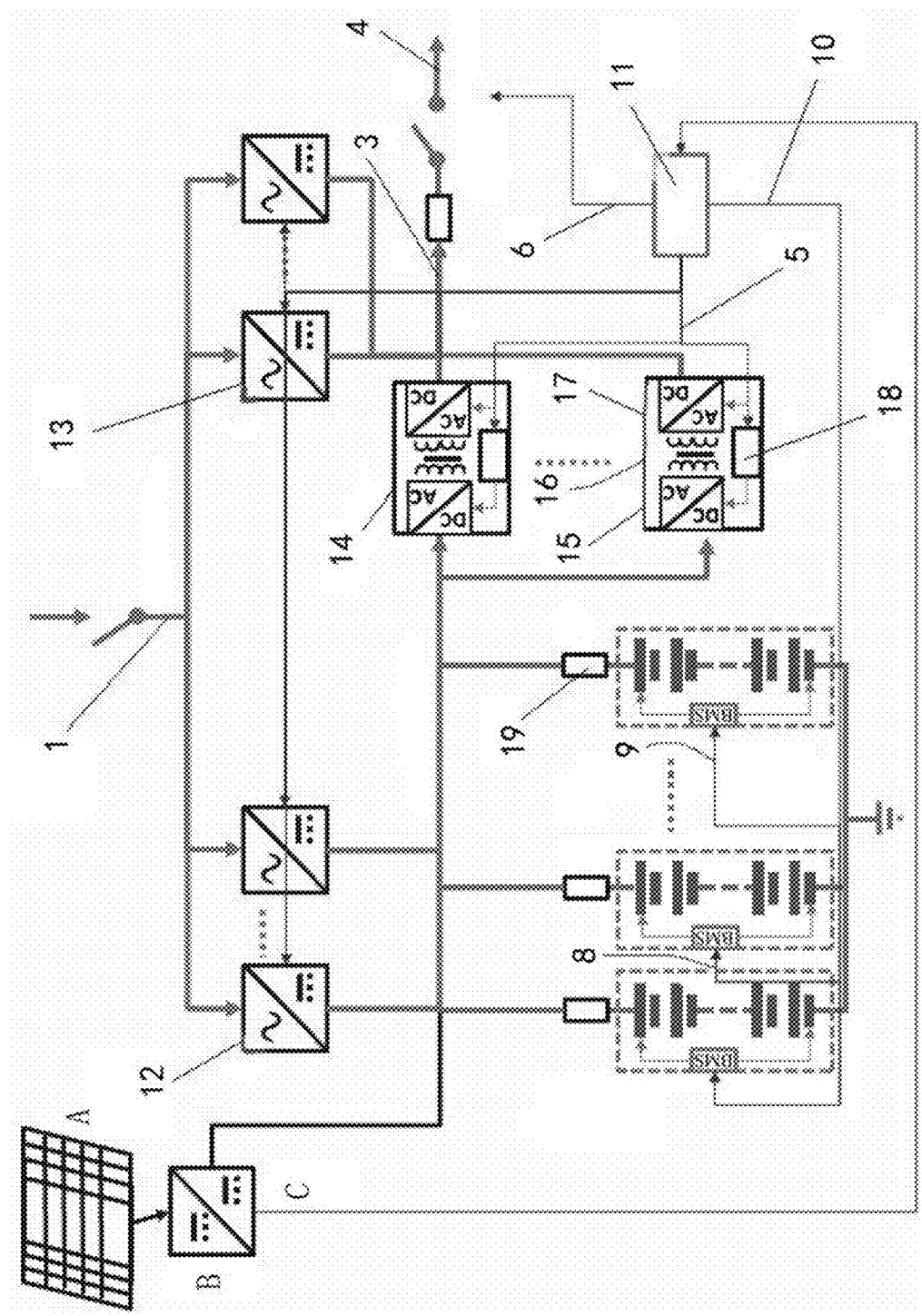
FIG. 3 is a schematic structural diagram of a second embodiment of the present invention.

As shown in FIG. 3, a photovoltaic array A is connected to an energy storage direct-current bus through a maximum power point tracking (MPPT) conversion apparatus B, meanwhile, a high-frequency isolation conversion apparatus makes the plurality of battery packs access to the load direct-current bus, and meanwhile the load direct-current bus is connected to a charging port of an electric vehicle or other types of loads so as to charge the electric vehicle or other types of loads.

The above embodiment is a photovoltaic energy storage charging system, electric energy may be supplemented through the photovoltaic array, electricity is supplied to the energy storage direct-current bus through maximum power point tracking, then electricity is supplied to a load device through the load direct-current bus, and remaining electric energy is stored in battery packs through an energy storage system. When there is no solar energy or no enough solar energy, discharging is performed through alternating-current electricity or the battery packs so as to provide electric energy to a load bus.

What is said above is merely the detailed description of the present invention, however, the scope of protection of the present invention is not limited to this. Any variations or replacements that come into mind without creative work should be covered in the scope of protection of the present invention. Accordingly, the scope of protection of the present invention shall be subject to the scope of protection specified in the claims.

What is claimed is:

1. An energy storage charging system, comprising: an AC/DC conversion apparatus for high-frequency isolation transform and an energy storage charging direct-current bus, wherein a first connecting point of the AC/DC conversion apparatus is connected to an energy storage apparatus, a second connecting point of the AC/DC conversion apparatus is connected to an alternating-current electric grid, and the AC/DC apparatus makes electric energy of the electric grid be subjected to high-frequency isolation transform and then charge the energy storage apparatus;

a DC/DC conversion apparatus for high-frequency isolation transform and a load direct-current bus, wherein a first connecting point of the DC/DC conversion apparatus is connected to the energy storage charging direct-current bus, a second connecting point of the DC/DC conversion apparatus is connected to the load direct-current bus, and the DC/DC conversion apparatus makes electric energy of the energy storage apparatus connected to the energy storage charging direct-current bus be subjected to high-frequency isolation transform and then supply electricity to a load on the load direct-current bus;

the AC/DC conversion apparatus for high-frequency isolation transform and a load electricity-supply direct-current bus, wherein the first connecting point of the AC/DC apparatus is connected to the alternating-current electric grid, a second connecting point of the AC/DC apparatus is connected to the load direct-current bus, and the AC/DC apparatus makes the electric energy of the electric grid be subjected to high-frequency isolation transform and then supply electricity to the load, wherein the energy storage apparatus or the loads reversely feed electric energy back to the alternating-current electric grid through the double-way load electricity-supply AC/DC conversion apparatus; and an apparatus for charging an electric vehicle or other types of loads, wherein a first connecting point of the apparatus is the load direct-current bus, a second connecting point of the apparatus is a charging port of the electric vehicle or other types of loads, and a voltage of the bus and charging current of the electric vehicle or other types of loads are dynamically adjusted according to a voltage and current needed by the electric vehicle or other types of loads;

wherein the load direct-current bus is connected to the charging port of the electric vehicle or other types of loads; the DC/DC conversion apparatus comprises a DC/DC conversion control unit, the DC/DC conversion control unit internally controls a first-stage converter, a second-stage converter and a high-frequency isolation trans-former to work, externally has a communication bus connected with a system main control unit and communicates with the DC/DC conversion apparatus through the system main control unit so as to control discharge voltage, current and power of the energy storage apparatus;

wherein conversion power of the AC/DC apparatus connected to the load electricity-supply bus is controlled by a system main control unit, and the system main control unit controls conversion voltage, current and power in a preset optimal control mode according to current charging demands of an electric vehicle or other types of loads, current conditions of power and electricity charge of the electric grid, current conditions of power demands of other charging devices in the electric grid and features of the energy storage apparatus.

2. The energy storage charging system according to claim 1, wherein the DC/DC conversion apparatus for high-frequency isolation transform comprises a first-stage converter, a high-frequency isolation transformer and a second-stage converter, the first-stage converter is connected with an energy storage charging bus, the second-stage converter is connected with the load direct-current bus, and the high-frequency isolation transformer is connected with the first-stage converter and the second-stage converter.

3. The energy storage charging system according to claim 2, wherein direct-current electric energy of an energy storage unit is converted into high-frequency electric energy through the first-stage converter of the DC/DC conversion apparatus via an energy storage direct-current bus, converted into high-frequency electric energy with different voltages through conversion of the high-frequency isolation transformer, and then converted into a direct current via the second-stage converter to be output to the load direct-current bus.

4. The energy storage charging system according to claim 1, wherein electric energy on two sides of the high-frequency isolation transformer of the DC/DC conversion apparatus is isolated through the high-frequency isolation transformer, electric conductors on the two sides are not in direct conduction, and the high-frequency electric energy is transmitted from one side to the other side through electromagnetic induction.

5. The energy storage charging system according to claim 1, wherein the energy storage direct-current bus comprises a positive bus and a negative bus, the positive bus and the negative bus are connected to one or more high-frequency isolation DC/DC conversion apparatuses respectively and meanwhile are connected to a load charging bus and an apparatus thereof through an input/output access point for discharging.

6. The energy storage charging system according to claim 1, wherein the electric energy of the alternating-current electric grid is converted through the AC/DC conversion apparatus and then is stored in the energy storage apparatus through the energy storage direct-current bus, in a process of electric energy inputting, a voltage and a current of the electric energy change according to demands of the energy storage apparatus; or the energy storage direct-current bus is connected with various energy storage apparatuses and/or a photovoltaic array, and different types of energy storage apparatuses or a plurality of same energy storage apparatuses are connected to the same energy storage direct-current bus for electric energy storage and exchange.

7. The energy storage charging system according to claim 1, wherein the AC/DC conversion apparatus for high-frequency isolation transform comprises a first-stage converter, a high-frequency isolation transformer and a second-stage converter, the first-stage converter is connected with the alternating-current electric grid, the second-stage converter is connected with the energy storage direct-current bus, and the high-frequency isolation transformer is connected with the first-stage converter and the second-stage converter.

8. The energy storage charging system according to claim 1, wherein electric energy on two sides of a high-frequency isolation transformer is isolated through the high-frequency isolation transformer, electric conductors on the two sides are not in direct conduction, and high-frequency electric energy is transmitted from one side to the other side through electromagnetic induction.

9. The energy storage charging system according to claim 1, wherein the AC/DC conversion apparatus comprises an AC/DC conversion control unit, the AC/DC conversion control unit internally controls the first-stage converter, the second-stage converter and the high-frequency isolation transformer to work, externally has a communication bus connected with a system main control unit and communicates with the AC/DC conversion apparatus through the system main control unit to control electric energy conversion of the energy storage direct-current bus from the electric grid so as to realize electric energy storage of the energy storage apparatus.

10. The energy storage charging system according to claim 1, wherein a load electricity-supply bus comprises a positive bus and a negative bus, the positive bus and the negative bus are connected to one or more high-frequency isolation AC/DC conversion apparatuses respectively, the other side of the apparatus is connected to the alternating-current electric grid, the electric energy of the electric grid is converted into direct-current electric energy to supplement the load electricity-supply bus.

11. The energy storage charging system according to claim 1, wherein the quantity of charging ports is one or more, power allocation and switching are performed among different load electricity-supply buses connected with the corresponding charging ports, the system main control unit realizes control over a voltage, current and power of the load electricity-supply buses through control over energy storage charging AC/DC, energy storage discharge DC/DC and load electricity-supply AC/DC according to electricity-supply demands of an electric vehicle or other types of loads.

12. The energy storage charging system according to claim 1, wherein the system main control unit is a single integrated main control unit, or a collecting and distributing type of main control unit formed by combining a plurality of control units in a layered architecture.

* * * * *